Figure 1:
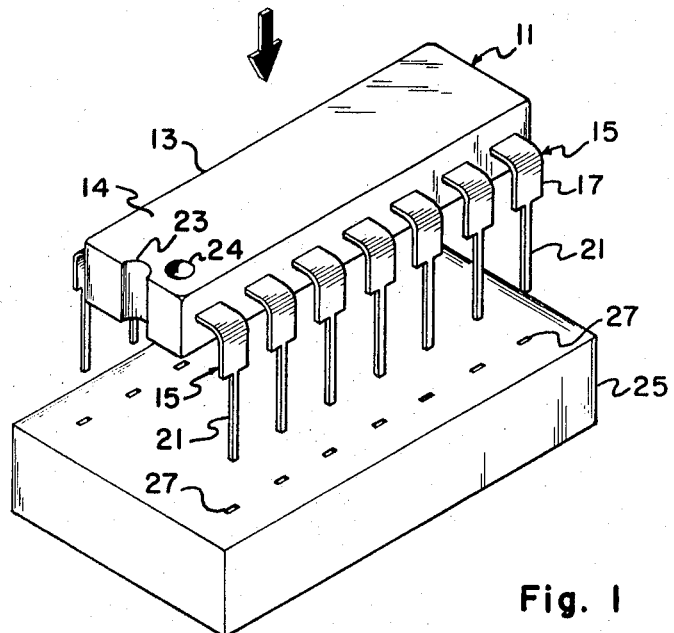

United States Patent

[11] 3,573,617

[72] Inventors Ellwood A. Randolph
  Winter Garden, Fla.;
  Paul A. Baump, Reseda, Calif.
[21] Appl. No. 678,560
[22] Filed Oct. 27, 1967
[45] Patented Apr. 6, 1971
[73] Assignee AAI Corporation
  Cockeysville, Md.

[54] METHOD AND APPARATUS FOR TESTING PACKAGED INTEGRATED CIRCUITS
  9 Claims, 3 Drawing Figs.
[52] U.S. Cl. .................................................. 324/158,
  317/101, 339/17, 339/174
[51] Int. Cl. ..................................................... G01r 31/22,
  G01b 7/16
[50] Field of Search .......................................... 324/158
  (F); 339/17 (CF), 17 (L), 174, 176; 317/101, 101
  (A), 101 (B), 101 (C), 101 (CC), 101 (CM), 101
  (CP)

[56] References Cited
  UNITED STATES PATENTS
  1,718,529 6/1929 Coldwell ..................... 324/158UX
  3,354,394 11/1967 James ........................... 324/158
  3,441,853 4/1969 Bodine .......................... 324/158

*Primary Examiner*—Rudolph V. Rolinec
*Assistant Examiner*—Ernest F. Karlsen
*Attorney*—Reginald F. Pippin, Jr.

ABSTRACT: A test apparatus is disclosed for testing a dual in-line packaged integrated circuit having dual rows of leads protruding laterally in respectively opposite directions from the package and bent normal thereto in a common direction. The test apparatus has a test head with dual rows of oppositely paired interfacing spaced contacts which are resiliently laterally inwardly biased towards each other and adapted to be engaged and laterally outwardly displaced from their quiescent position by the leads of the dual in-line packaged integrated circuit inserted between the dual rows of oppositely paired contacts. Each of the contacts is connected to a tester adapted to apply selected signals to selected contacts and sense the result thereof to determine the electrical condition of the integrated circuit inserted on the test head. To protect the dual rows of contacts, a cover with separators extending between each of the adjacent contacts is provided on the test socket which also serves to guide a packaged integrated circuit into engagement with the contacts on the test head. In addition, finger-accommodating recesses are provided to facilitate the insertion of a packaged integrated circuit onto the test head.

Patented April 6, 1971

3,573,617

2 Sheets-Sheet 1

Ellwood A. Randolph
Paul A. Baump
INVENTORS

BY Reginald F. Piffin

ATTORNEY

Ellwood A. Randolph
Paul A. Baump
INVENTORS

METHOD AND APPARATUS FOR TESTING PACKAGED INTEGRATED CIRCUITS

This invention relates to a method and apparatus for testing large numbers of dual in-line packaged integrated circuits.

In the testing of large quantities of packaged integrated circuits it is desirable to be able to place a packaged integrated circuit on a test head where the leads of the integrated circuits engage the test contacts of a test apparatus, perform a test or series of tests, and remove the packaged integrated circuit upon completion of the test operation in such a manner as to minimize delays in the test operation resulting from the movements involved in the handling operation, and thereby maximizing the number of packaged integrated circuits tested within a given period of time. Furthermore, it is desirable to employ a method and apparatus for testing which enables an operator to effect engagement between the packaged integrated circuit leads and the test apparatus contacts even though some of the packaged integrated circuit leads are bent and therefore difficult to bring into engagement with the contacts of the test apparatus which are positioned on the test head.

Accordingly, it is a feature of this invention to test a dual in-line packaged integrated circuit by placing it on a test head in a manner that effects engagement between the packaged integrated circuit leads and the test apparatus contacts even though some or all of the packaged integrated circuit leads are bent.

It is a further feature of the present invention to provide a test apparatus having a test head with a shape and arrangement of test contacts which enables a testing operator to easily place a dual in-line packaged integrated circuit thereon and effect engagement between the packaged integrated circuit leads and the test contacts.

In accordance with the present invention, a dual in-line packaged integrated circuit is placed backwards on a test head having a plurality of protruding paired test contacts arranged in dual rows and adapted to receive and engage the leads of a packaged integrated circuit inserted between the dual rows of paired contacts. A finger-accommodating recess is formed at each end of the test head between the dual rows of paired contacts to facilitate the insertion of a packaged integrated circuit onto the test head by a testing operator. In addition, a protective cover is provided on the test head for each of the dual rows of paired contacts which encloses the back side of each row of contacts and separates the contacts from each other to protect them from damage and serve as a guide for insertion of a dual in-line packaged integrated circuit onto the test socket.

Figure 3:
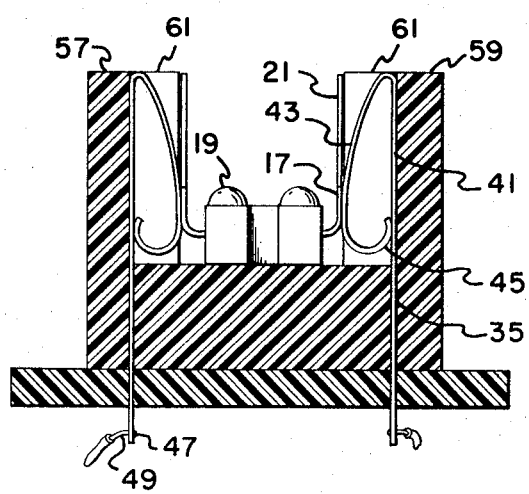
Figure 2:
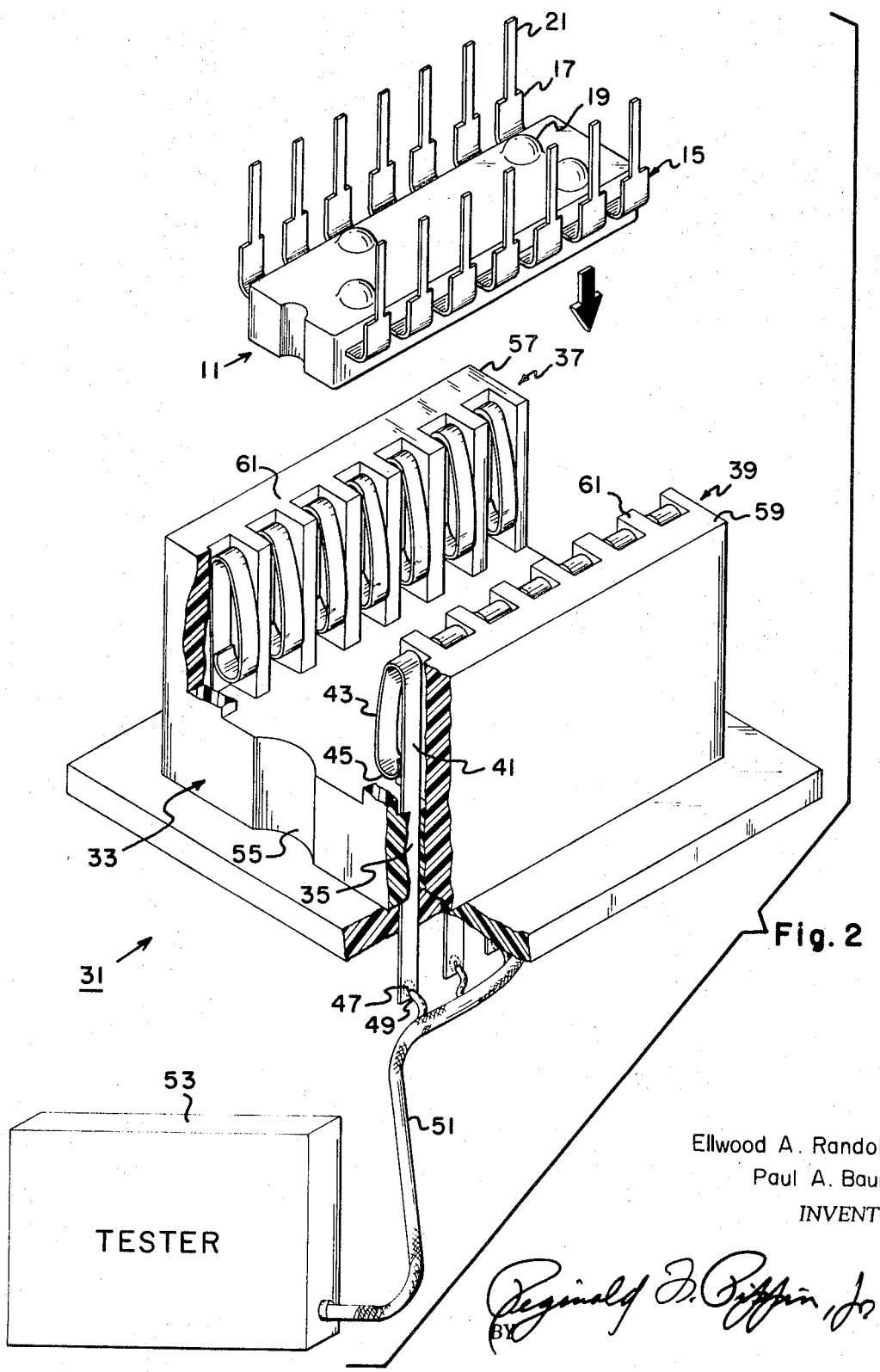

Still other objects, features and attendant advantages will become apparent to those skilled in the art from a reading of the following detailed description of the following embodiment constructed in accordance with the invention, taken in conjunction with the accompanying drawings wherein:

FIG. 1 is a schematic orthographic illustration of a dual in-line packaged integrated circuit being placed on a printed circuit board in the normal manner with the leads being inserted into dual rows of feed-through holes;

FIG. 2 is a schematic orthographic illustration of a test head of a test apparatus constructed according to the present invention with a dual in-line packaged integrated circuit placed thereon in accordance with the method of testing this invention; and FIG. 3 shows a cutaway view of a test head constructed according to the present invention with a dual in-line packaged integrated circuit inserted therein in a test position.

Referring now in detail to the FIGS. of the drawing, in FIG. 1 is shown a typical conventional dual in-line packaged integrated circuit assembly, generally indicated at 11, which is specifically designed for use with printed circuit boards and which may be handled and tested in accordance with the method and apparatus of the present invention. The overall packaged integrated circuit assembly 11 includes an integrated circuit arrangement, generally referred to herein as a dual in-line packaged integrated circuit, having a body 13 with a generally rectangular configuration and leads, generally indicated at 15, protruding laterally from opposite sides and which are bent normal to the packaged assembly in a common direction away from the top side 14. The leads 15 of the dual in-line packaged integrated circuit 11 have a portion 17 extending normal to the body 13 for a distance generally equal to the distance that a group of nipples 19 formed on the bottom side 16 of the body 13 protrude, as shown in FIG. 2. A relatively narrower portion of the leads 15 extends for a much greater length therebeyond and are adapted to be inserted into the feed-through holes of a printed circuit board. The dual rows of integrated circuit leads 15 are distinguished from each other by a notch 23 formed at one end of the body 13 between the rows of leads 15 and a dimple 24 formed in one corner of the body 13.

In FIG. 1, the dual in-line packaged integrated circuit 11 is shown positioned above a printed circuit board 25 having dual rows of feed-through holes 27 adapted to receive the leads of an electrical device. The dual in-line packaged integrated circuit 11 is specifically designed for use with a printed circuit board 25 and the arrow above the packaged integrated circuit 11 indicates the direction of motion that it undergoes in being placed on the printed circuit board 25, or on any other object, with the dual rows of leads 15 extending in the direction of motion for insertion into the dual rows of feed-through holes 27. Both the nipples 19 and the relatively wide portion 17 of the leads 15 are adapted to engage the surface of the printed circuit board 25 to keep the body 13 of the dual in-line packaged integrated circuit off the printed circuit board while the narrow portions 21 of the leads 15 extend into the feed-through holes 27 of the printed circuit boards.

In the past, dual in-line packaged integrated circuits 11 have been tested in accordance with the manner of placing a dual in-line packaged integrated circuit 11 on a printed circuit board 25, that is, they have been placed on a test head of a test apparatus with the leads of the packaged integrated circuit extending in the direction of the motion. To prevent the testing operator from exerting too much pressure on the relatively thin portions 21 of the leads 15 of the dual in-line packaged integrated circuit 11 and thus bending or otherwise damaging them, male test heads, having test contacts positioned on the sides, have been used so that the dual in-line packaged integrated circuit 11 can be placed over the male test head and effect engagement with the test contacts positioned on the sides while the protruding nipples 19 formed on the bottom side 16 of the packaged integrated circuit 11 engage the upper surface of the test head and limit the downward movement thereon.

However, this method of testing a dual in-line packaged integrated circuit 11 wherein it is placed on a test head with the leads 15 extending in the direction of motion, and the use of a male test head to accommodate such a method of testing is disadvantageous for use in testing large quantities of dual in-line packaged integrated circuits 11, because it requires all of the leads 15, particularly the relatively thin portions 21, to be straight before being placed upon the test head to perform the test operation. For example, if the thin end portion of a head 15 is bent outwardly away from the test head, then it may fail to engage one of the test contacts on the side of the male test head and thus prevent the test operation from being performed. Also, if a lead 15 is bent inwardly towards the test head, then it may engage the top of the male test head and accordingly prevent the packaged integrated circuit 11 from being pressed down over the test head and is likely to result in the packaged integrated circuit being damaged.

Furthermore, the test contacts of a male test head are usually resiliently biased outwardly away from the sides of the test head to effect a firm engagement with the leads 15 of the packaged integrated circuit 11, and because only the relatively thin portion 21 of the leads are pressed down over the test head, they are apt to be bent somewhat by the resiliently biased test contacts. When large quantities of dual in-line packaged integrated circuits 11 are being tested, it is likely that a number of them may have at least one bent lead, and accordingly a test operation requiring a dual in-line packaged integrated circuit to be placed on a male test head, with the leads extending in the direction of motion, may thereby result in a number of such packaged integrated circuits being falsely recorded as electrically defective, unless steps are taken to assure the necessary alignment, such as by operator adjustment or by use of extra lead-alignment fixtures.

From the foregoing, it will be appreciated that it is desirable to utilize a method of testing a dual in-line packaged integrated circuit 11 which will enable the testing operator to effect engagement between the packaged integrated circuit leads 15 and the contacts of a test head irrespective of whether the packaged integrated circuit 11 has a bent lead 15. It has been found that a dual in-line packaged integrated circuit 11 can be tested more easily and reliably by placing it backwards on a test head, that is, with the leads reversed and extending oppositely to the direction of motion that the packaged integrated circuit undergoes in being placed on the test head. By placing a dual in-line packaged integrated circuit onto a test head in this manner, the wider, sturdier and more rigid portion 17 of the leads 15 are engaged by the test contacts first, rather than the relatively thinner, less rigid and more easily damaged portion 21 of the leads 15 which are also more likely to be bent. In addition, this method of testing renders the wider portions 17 of the leads 11 more accessible to engagement by a properly positioned test contact because there are no protruding nipples 19 to hold the body 13 of the dual in-line packaged integrated circuit 11 away from the test head and thus hold the wide portions 17 of the leads 15 away from the test contacts. Accordingly, this method of testing alleviates in large measure the difficulties associated with packaged integrated circuits having bent leads and enables a testing operator to easily place dual in-line packaged integrated circuits 11 on a test head and effect engagement with the test contacts.

From the foregoing, it will also be appreciated that it is desirable to have a test apparatus with a test head capable of properly receiving a dual in-line packaged integrated circuit placed backwards thereon, that is, with the leads extending opposite to the direction of motion, and having a plurality of contacts adapted to firmly engage the leads 15 of a dual in-line packaged integrated circuit 11 irrespective of whether the leads 15 are bent. A test apparatus, generally indicated at 31, with a preferred embodiment of a test head constructed in accordance with this invention and generally indicated at 33, is shown in FIGS. 2 and 3, which also illustrate the method of testing a dual in-line packaged integrated circuit according to the invention.

The test head 33 has a plurality of oppositely paired test contacts, generally indicated at 35, protruding upwardly therefrom and arranged in dual parallel rows, generally indicated at 37 and 39 respectively, which are spaced sufficiently apart to accommodate a dual in-line packaged integrated circuit 11 therebetween. The paired test contacts 35 are formed from a strip of electrically conductive elastically resilient material, such as brass or other desired material, with each contact 35 having an upstanding portion 41 which is bent downwardly toward the oppositely paired contact to form a camming portion 43 which is adapted to be engaged by the lead 15 of a dual in-line packaged integrated circuit 11 as it is inserted between the dual rows 37 and 39 of oppositely paired contacts 35. The end of the camming portion 43 is bent upwardly away from the oppositely paired contact to form an end portion 45 which engages the upstanding portion 41, thereby providing a contact 35 which is resiliently self-biased at both the upper and lower bent portions. The oppositely paired contacts 35 are capable of being laterally compressed to firmly engage the laterally and oppositely protruding leads 15 of a dual in-line packaged integrated circuit 11 inserted between the dual rows 37 and 39 of oppositely paired contacts 35, and exert a lateral force thereupon to hold the packaged integrated circuit 11 in a test position.

To enable a test operator to more easily insert a dual in-line packaged integrated circuit between the dual rows 37 and 39 of paired contacts 35, a finger-accommodating recess 55 is formed between the dual rows 37 and 39 of contacts at opposite ends of the test head 33. This finger-accommodating recess 55 is an advantageous addition to the finger-accommodating effective end opening formed at each end of the dual rows of interfacing contacts 43 as an extension of and laterally communicating with the quiescent test-package-receiving space between the rows of contacts. In addition, dual protective covers, 57 and 59, are formed on the test head 33 which enclose and contact the back side of each of the dual rows of contacts 37 and 39 and have a series of laterally extending portions 61 which extend between each of the contacts to separate the contacts 35 from each other, thereby serving to protect them from damage as well as providing guides for the leads 15 of a dual in-line packaged integrated circuit 11 as it is inserted between the dual rows of paired contacts. Preferably, the contact face of each contact 35 in the quiescent position extends inwardly beyond the corresponding inner face of the laterally adjacent associated separator portions 61.

Each of the contacts 35 has a portion 47 extending beneath the test head 33 which is connected by a conductor 49 that forms part of the cable 51 that, in turn, is connected to a tester, generally indicated at 53, which is adapted to perform a test upon the packaged integrated circuit 11 placed on the test head 33 by applying selected electric signals to selected contacts of the test head and sense the result thereof.

In operation, when it is desired to test a dual in-line packaged integrated circuit 11, the operator may grip the two opposite ends of the portion of the body 13 of the packaged integrated circuit which extend beyond the oppositely laterally protruding leads 15 and insert the packaged integrated circuit backwards, that is, with the leads extending opposite to the direction of motion, between the dual rows 37 and 39 of oppositely paired contacts 35 on the test head 33. As the test operator presses the dual in-line packaged integrated circuit 11 downwardly onto the test head 33, the laterally and inwardly protruding contact separator portions 61 of the dual protective covers 57 and 59 serve to guide the leads 15 of the packaged integrated circuit 11 into engagement with the camming portion 43 of the test contacts 35 which protrude slightly beyond the separators 61. As the leads 15 of the packaged integrated circuit 11 engage the camming portion 43 of the resiliently biased and oppositely paired contacts 35, they exert a lateral force on the pairs of test contacts which compress them laterally away from each other to a point approximately equal to the ends of the inwardly protruding separators, thereby causing the contacts 35 to elastically flex at both the upper and lower bent portions thereof, to effect a firm engagement with the leads 15 of the packaged integrated circuit 11 and also hold the packaged integrated circuit in the test position. As the packaged integrated circuit is pressed between the dual rows of contacts 37 and 39, the finger recesses 55 formed between the dual rows of contacts 37 and 39 at opposite ends of the test head 33 permit the test operator's fingers to extend downwardly in the direction of the test head, thus enabling him to easily and quickly place the packaged integrated circuit on the test head 33.

After the dual in-line packaged integrated circuit 11 has been inserted on the test head 33, the operator will close a switch, not shown, which may desirably be located on the tester or at some remote station, and initiate a test operation by which the tester applies selected electrical signals to selected contacts of the test head and senses the result thereof to determine the electrical characteristics of the particular packaged integrated circuit 11 engaging the contacts 35 of the test head 33. Upon completion of the test operation, the operator will once again grip the two opposite ends of the body 13 of the dual in-line packaged integrated circuit 11 and lift it upwardly, thereby removing it from engagement with the test contacts 35 and away from the test head 33. This test sequence may be repeated quickly and easily for each packaged integrated circuit that it is desired to test.

Due to the novel method of testing a dual in-line packaged integrated circuit 11 by placing it backwards on a test head 33, that is, with leads reversed and extending oppositely to the direction of motion, as well as providing a test head 33 adapted to receive a packaged integrated circuit between the contacts 35, rather than covering them, the presence of a bent lead 21 will not prevent the packaged integrated circuit from being placed on the test socket, nor prevent the test contacts 35 from engaging the bent lead. Accordingly, a test operator may easily test large quantities of dual in-line packaged integrated circuits 11 without first having to check each of them to determine if there are any bent leads 15 and without being required to straighten a bent lead 15 before attempting to place a packaged integrated circuit on the test head 33 and initiate the testing process. Accordingly, a test operator is able to test a larger number of packaged integrated circuits within a given period of time.

While the invention has been illustrated and described with respect to a single preferred embodiment, it will be apparent to those skilled in the art that various embodiments, modifications and improvements may be made without departing from the scope and spirit of the invention. For example, the reverse bend 45 at the bottom of the camming portion of the contact 15 may be eliminated if lighter spring action is disclosed, and/or the finger-accommodating recesses 55 may be formed by a single common longitudinal recess extending along the length of the test head 33 between the dual rows of oppositely paired contacts. In addition, the spacing between the rows of contacts may be varied to accommodate packaged integrated circuits having leads which do not extend beyond the body of the packaged integrated circuits. Further, the term tester as utilized herein is intended to include all apparatus which may be employed to actively apply an electrical signal to a packaged electrical circuit and receive therefrom an electrical circuit condition indication as a function of the applied electrical signal. In this context, electrical testers may include conventional active electronic or electrical circuits which carry out these functions. Likewise, the term "testing" is intended to include all active applications of selected electrical signals to selected leads of a packaged electrical circuit and the sensing of the result thereof, independent of the particular apparatus employed to apply and sense. Also, while the invention is normally practiced on a temporary insertion and removal basis for packaged electrical circuits in accordance with the method and apparatus, it will be appreciated that the method and apparatus may be practiced with a single packaged electrical circuit on a long term insertion basis which may require repeated, sequential, or other desired application of electrical signals to the packaged electrical circuit, thus encompassing what one might normally consider a permanent, though replaceable, insertion of the packaged electrical circuit into the test head for repeated electrical operation with respect thereto. Accordingly, it is to be understood that the invention is not to be limited by the illustrated embodiment but only by the scope of the appended claims.

We claim:

1. The method of testing a packaged electrical circuit having a central electrical-circuit-containing body with a plurality of leads arranged in dual rows protruding in respectively opposite lateral directions from the central body and bent normal thereto in a common direction, comprising the steps of:
moving the central electrical-circuit-containing body with its associated packaged electrical circuit and rows of leads into male engagement with dual rows of laterally spaced test contacts forming a joint female union and with the dual leads of the packaged electrical circuit extending oppositely to the direction of movement;
applying selected electrical signals to selected test contacts and sensing the result thereof to determine the electrical characteristics of the packaged electrical circuit; and
removing the central body with its packaged electrical circuit from engagement with the dual rows of test contacts with the leads of the packaged electrical circuit extending in the direction of the initial removal movement.

2. The method of testing a packaged electrical circuit according to claim 1, further comprising the initial step of gripping the packaged electrical circuit central electrical-circuit-containing body at the opposite ends of the body between the dual rows of leads.

3. The method of testing a packaged electrical circuit according to claim 1, further comprising the initial step of manually gripping the packaged electrical circuit central electrical-circuit-containing body at the opposite ends of the body between the dual rows of leads, and effecting said movement of said packaged electrical circuit central electrical-circuit-containing body into the position for testing by transporting the packaged electrical circuit manually into said engagement with the dual rows of test contacts and effecting said removal of said electrical-circuit-containing body from said test socket manually.

4. Apparatus for testing a packaged electrical circuit having a plurality of leads arranged in dual rows protruding in respectively opposite lateral directions from the package and bent normal thereto in a common direction, comprising:
a test head having a plurality of oppositely interfacing female unit contacts arranged in dual rows and spaced apart on support means;
said oppositely interfacing contacts being upwardly opening and resiliently biased laterally toward each other with a quiescent space therebetween less than the outermost distance between the dual rows of the packaged electrical circuit leads;
a finger-accommodating effective end opening at each end of said dual rows of interfacing contacts and communicating with said open quiescent space therebetween; and
a tester electrically connected to the contacts of said test head and adapted to apply and sense the result of selected electrical signals at selected contacts of said test head to determine the electrical characteristics of the packaged electrical circuit engaging said contacts.

5. Apparatus for testing a packaged electrical circuit according to claim 4, further comprising dual protective covers on the test head for the dual rows of test contacts and having separators extending between the adjacent test contacts which serve as guides for the insertion of a packaged electrical circuit onto said test head.

6. Apparatus for testing a packaged electrical circuit having a plurality of leads arranged in dual rows protruding in respectively opposite lateral directions from the package and bent normal thereto in a common direction, comprising:
a test head having a plurality of oppositely interfacing contacts arranged in dual rows and spaced apart on support means, said oppositely interfacing contacts being upwardly open and resiliently biased laterally toward each other and adapted to be engaged and laterally displaced from a quiescent position and away from each other by the leads of the packaged electrical circuit inserted therebetween;
stop means formed on said test head and adapted to be engaged by a packaged electrical circuit inserted between the dual rows of interfacing contacts;
a finger-accommodating effect opening between the dual rows of test contacts and at each end thereof to facilitate the insertion of a packaged electrical circuit onto said test head; and
a tester electrically connected to the contacts of said test head and adapted to apply and sense the result of selected electrical signals at selected contacts of said test head to determine the electrical characteristics of the packaged electrical circuit engaging said contacts.

7. Apparatus for testing a packaged electrical circuit according to claim 6, further comprising dual protective covers on said test head for the dual rows of test contacts and having separators extending between the adjacent test contacts which serve as guides for the insertion of a packaged electrical circuit onto said test head.

8. Apparatus for testing a packaged electrical circuit according to claim 7 said oppositely interfacing contacts being formed from an electrically conductive elastically resilient material with each contact protruding upwardly from said test head and having an upstanding portion and being bent downwardly toward said oppositely interfacing contact to form a first bent portion and a camming portion adapted to be engaged by a lead of a packaged electrical circuit inserted between the dual rows of the upwardly protruding contacts, said contacts being resiliently self-biased at said first bent portion.

9. Apparatus for testing a packaged electrical circuit according to claim 8 said upwardly protruding oppositely interfacing contact having the end of the downwardly extending camming portion being bent upwardly and away from said oppositely interfacing contact to form a second bent portion with the end of the contact engaging said upstanding portion, said contacts being resiliently self-biased at both said first and second bent portions.